United States Patent Office 3,510,256
Patented May 5, 1970

3,510,256
ALKALI TREATMENT OF CHROMIUM ORES
Heinrich Schäfer, Cologne-Flittard, Germany, assignor to Farbenfabriken Bayer Aktiengesellschaft, Leverkusen, Germany, a corporation of Germany
No Drawing. Filed July 10, 1967, Ser. No. 651,978
Claims priority, application Germany, July 12, 1966,
F 49,674
Int. Cl. C01g *37/14*
U.S. Cl. 23—56    13 Claims

ABSTRACT OF THE DISCLOSURE

Process for the production of sodium-chromate from chromium-containing material, e.g., chromium ore, under oxidizing conditions with sodium hydroxide, e.g., in a rotary tube furnace, in which the chromium-containing material optionally containing the usual additions, e.g., dolomite, iron oxide and/or recycled treatment residue previously recovered from the process, is heated to a temperature of between about 800 and 1200° C. by oxygen rich combustion gases and wherein liquified sodium hydroxide is sprayed onto the chromium containing material at a point during the heating when the chromium containing material is at a temperature of above 500° C. and below 1200° C., preferably of between 600 and 1000° C., and continuing the heating, and thereafter recovering the sodium-chromate by dissolving and separating from the insoluble residue and with the treatment optionally being carried out in a single stage or at least two or three repeated stages.

---

This invention relates to a process for the production of sodium-chromate by alkali treatment of chromium ores under oxidising conditions at elevated temperatures.

It is known in the art that sodium carbonate optionally together with additives such as lime, dolomite and iron oxide is almost exclusively used for the alkali treatment of chromium ore. The treatment process is effected primarily in a rotary tube, a plate furnace or a hearth-type annular furnace at a temperature around 1000° C., i.e. due to the high melting point of sodium carbonate, and in an oxidising atmosphere, with the materials being premixed together.

The so-called Bitterfelder process, in which the alkali treatment of a chromium ore is effected at a comparatively low temperature (about 500° C.) with a potassium hydroxide solution, is of less importance in the art. In that process, a mixture of chromium ore and potassium hydroxide solution is sprayed into a rotary furnace heated with a hydrogen flame.

Since the Bitterfelder process can only be carried out economically where hydrogen and a potassium hydroxide solution are available in sufficient quantities, it is not of general importance in the art.

According to the process of German Pat. No. 163,814, chromite is, for example, premixed with solid sodium hydroxide and then reacted in the presence of an oxygen-yielding substance, such as pyrolusite, iron oxide, lead oxide or copper oxide at a temperature of from 500° C. to 600° C. with corresponding melting of the premixed mass. According to German Pat. No. 171,089, the oxidising substances in the process as described above can be replaced by air, which is blown in finely divided form into the melt.

Attempts to replace the potassium hydroxide solution by a sodium hydroxide solution in the so-called Bitterfelder process have been unsuccessful because of undesired caking and sticking, which prevent the necessary thorough mixing of the reactants; similarly, treatment processes with a sodium hydroxide solution sprayed in admixture with the chromium ore under pressure, proved to be impracticable technically.

However, since increasing quantities of sodium hydroxide solution are formed with increasing chlorine production, which quantities must be used industrially to exploit their economic value, great interest exists in the use of a sodium hydroxide solution, at least in part, in those technical processes in which formerly sodium carbonate was used, e.g. to treat chromium ores.

It has now been found in accordance with the present invention that a process for the production of sodium-chromate by alkali treatment of chromium-containing materials may be provided in which the chromium-containing material, preferably after the addition of the usual additives such as diluents, is heated continuously in a reaction zone by oxygen-rich combustion gases to a temperature of between 800 and 1200° C., and preferably of between 900 and 1000° C., and wherein at a temperature of above 500° C. and below 1200° C. liquified sodium hydroxide is mixed with said material, i.e., by spraying the liquified sodium hydroxide onto said material, with the heating thence being continued, thus forming sodium-chromate, which sodium chromate is recovered by dissolving and separating from the insoluble residue.

The sodium hydroxide may be used either in the form of an aqueous solution or a melt.

The new process is a modification of the well-known soda-treatment of chromium-containing materials, wherein the chromium-containing materials premixed with soda and optionally other additives such as diluents are heated by oxygen-rich combustion gases to temperatures of between 800 and 1200° C. Surprisingly it has been found in accordance with the invention that at least a part of the soda necessary for the sodium-chromate-formation can be replaced by liquified sodium hydroxide if it is sprayed on said chromium-containing material preheated in a rotary tube furnace to a temperature of at least 500° C.

This process can be carried out in a particularly advantageous manner in a rotary tube furnace operated in counter-current, by the waste heat of the combustion gases being utilised for heating up the crude mixture and by using the rotary furnace itself as a mixing assembly. The sodium hydroxide solution is supplied from the material inlet side of the furnace into a zone within the furnace in which the material to be treated has already been heated by the waste gases to at least 500° C. The sodium hydroxide solution can also be applied from the material outlet side or from both sides simultaneously, i.e. into said zone. It is only important that the material to be treated should be at a temperature above 500° C. when it comes into contact, i.e., by spraying, with the sodium hydroxide-containing caustic solution, preferably 600–1000° C., whereby caking and sticking are avoided.

It is surprising that, despite the relatively low speed of rotation of the usual rotary furnaces, a very favourable distribution of the sodium hydroxide solution is obtained. The treatment proceeds in the temperature range indicated without any difficulty. By contrast with the sodium carbonate process, the treatment with sodium hydroxide solution as such already occurs at a sufficient rate at a temperature of from 800° C. to 900° C. The same material being roasted, however, remains moist and tacky and has a tendency to cake. At a temperature around 1000° C., on the contrary, solid melt granules are obtained which permit the furnace to be satisfactorily operated.

The sodium hydroxide solution is used in a concentration of at least 30% by weight, but advantageously 40–60% by weight. Solutions of lower concentration should not be used in order to avoid the introduction of too large quantities of water. No upper limit is set for the concentration, provided that the caustic solution is kept at a temperature above the solidification point and thus is capable of being pumped. For example, it is also possible to work with an NaOH melt.

It is possible for the entire quantity of alkali necessary for the formation of sodium-chromate to be introduced in the form of sodium hydroxide solution of melt. However, a more or less large part of the sodium hydroxide to be used can be replaced by sodium carbonate solution but only in an amount less than the equivalent quantity necessary. The treatment can proceed intermittently but advantageously also continuously in a rotary tube furnace, which in the usual way is heated from inside by combustion of oxygen-containing gas with a fuel such as gas, oil and/or coal dust, either in counter-current flow or in unidirectional flow, usually such that excess oxygen is present for the chromium treatment.

As known from the prior art, it is possible to operate either in a single-stage process or in a multi-stage process, and with the addition of known leaning agents or diluents such as dolomite, lime, iron oxide or treatment residues from the lixiviation of the sodium-chromate. The quantity of alkali to be supplied must be adapted to the actual treatment procedure, it being possible to work with an excess, with a deficiency or with stoichiometric quantities of alkali, calculated on the chromium ore charge. The treated material is extracted, i.e. leached with water, dilute aqueous bichromate solution, or the like, and filtered, and the filtrate is further processed into chromate, bichromate or chromic acid, as desired. The treatment residue, which may contain unreacted chromium ore (depending on the degree of completion of the oxidation reaction which in turn depends upon the ratio of the reactants), as well as dolomite, iron oxide, and the like, may be recycled as diluent, with the unreacted chromium ore content serving as recycled starting material, as well, depending on the amount of fresh alkali and fresh chromium ore used as compared with the amount of recycled chromium ore and the degree of completion of the reaction in a given pass-through the rotary furnace.

One preferred example of the process is given below: A mixture consisting of 100 parts of finely ground chromium ore, 150–200 parts of dried extraction residues, e.g. treatment residues, and 0–50 parts of iron oxide, and optionally sodium carbonate in less than an equivalent quantity, is continuously delivered to a rotary furnace heated with lignite dust combusted with excess oxygen-containing gas, e.g. air. The material supply is on the side of the gas outlet (counter-current process.)

At the same time, 40%–60% sodium hydroxide solution is introduced through a pipe having having a cylindrical nozzle projecting far into the furnace in such a way that the compact stream impinges in one zone on the initially supplied crude mixture, in which zone the mixture has already been heated by the waste combustion gases to at least 500° C. The quantity of sodium hydroxide solution is such that, in the treatment mixture, there is up to about 20% more alkali than is necessary for the conversion to chromate of the chromium introduced with the ore.

An oxidising atmosphere is maintained inside the furnace. The fuel supply is regulated so that the temperature of he material in the reaction zone is adjusted to 900° C. to 1000° C. and the exhaust gas temperature on the side of the material in the reaction zone is adjusted to 900° C.

The chromate-containing reaction product discharged from the rotary furnace is wet-ground and filtered, and a part of the filter residue is dried and returned as extraction residue for the production of the crude mixture in the aforesaid manner.

Using the technique described above for the single-stage process, i.e. the described rotary tube furnace technique, the chromium ore treatment can also be carried out with sodium hydroxide solution in several stages, e.g., three stages. In the first stage, the rotary furnace is only charged with the ground chromium ore to which the sodium hydroxide containing caustic liquid is added after such charge has reached the preheating temperature above 500° C., while in the second stage it is only charged with leached and dried treatment or extraction residue from first stage throughput to which additional amounts of such caustic liquid are added after the required preheating. Thus, the addition of the sodium hydroxide solution is effected under the same conditions as in the above-mentioned single-stage process. However, 40%–50% of the theoretically required quantity of alkali, based on the chromium oxide actually present, is introduced in each of the first and second stages so that unreacted chromium ore may serve as treament residue in the next stage. In the third stage, the dried leaching or treatment residue of the second stage throughput is introduced in admixture with iron oxide. This time, 70%–80% of the theoretical alkali quantity is added after the required preheating and the leached residue is rejected, e.g. withdrawn and, if desired, discarded.

The process according to the invention is hereinafter more fully explained by reference to several further examples.

EXAMPLE 1

A mixture of (a) 100 parts of ground chromium ore containing—calculated as oxides—besides 44.9% of $Cr_2O_3$, 28.0% of $Fe_2O_3$, 18.6% of $Al_2O_3$, 9.8% of MgO and 2.0% of $SiO_2$; (b) 170 parts of dried leaching residue containing 8.2% of $Cr_2O_3$ and (c) 20 parts of iron oxide, is continuously introduced into a rotary furnace heated by burning coal dust with excess air and operating in counter-current fashion. A 50% sodium hydroxide solution is added to this mixture in the furnace by means of the single stage countercurrent arrangement described above and under the same conditions, i.e. with preheating of the initial mixture to 600–700° C. before contact with the sodium hydroxide solution, 37 parts by weight of the solution being used per 100 parts of initial mixture. The temperature of the material in the reaction zone is 960° C. and the exhaust gas temperature is 650° C. After the leaching of the reaction product with water to remove the soluble chromate present, a chromate yield of 80%–85% is obtained, based on the ore input, leaving an extraction residue of iron oxide, inert ore constituents and residual $Cr_2O_3$ which is recycled with fresh ore.

EXAMPLE 2

A crude mixture, which consists of 100 parts of chromium ore with 44.8% of $Cr_2O_3$, 160 parts of leaching residue with 7.9% of $Cr_2O_3$, 25 parts of iron oxide and 34.5 parts of sodium hydroxide, is treated in a single stage under similar conditions to those of Example 1 with the sodium hydroxide solution being added after preheating of the charged mixture to 600–700° C. 16 parts by weight of a 50.5% sodium hydroxide solution are used per 100 parts of the initially supplied mixture. The temperature of the material in the reaction zone is 980° C. and the exhaust gas temperature is 660° C. The yield based on the chromium ore introduced is from 82% to 84%, leaving a leaching residue, after treatment with water to remove the chromate content, which corresponds to the starting leaching residue and which is recycled.

EXAMPLE 3

The treatment is carried out in 3 stages. In the first stage, chromium ore with 44.4% of $Cr_2O_3$ is initially supplied and reacted in the rotary furnace, as described, e.g. with sodium hydroxide solution being added after pretreatment of the charged mixture to 600–700° C. with the use of excess air over that needed for fuel combustion. 37.5 parts by weight of 50% NaOH are used per 100 parts of ore. The temperature of the material in the reaction zone is 950° C. and the exhaust gas temperature is 620° C. With the leaching of the reaction product with water, 32%–33% of the chromium is obtained as filtrate in the form of chromate. The residue is dried and ground.

The leached and dried treatment residue, which contains on the average 33.4% of $Cr_2O_3$, is reacted in a second stage with sodium hydroxide solution, again after preheating the residue to 600–700° C. before contact with the caustic solution. 30 parts by weight of 50% NaOH are used per 100 parts of residue. The temperature of the material is 980° C. and the exhaust gas temperature is 660° C. The leaching yield is 42% of chromate.

The leaching residue of the second throughput, which has a $Cr_2O_3$ content of 22.2%, is mixed with iron oxide (20 parts of iron oxide for 100 parts of residue) and treated with sodium hydroxide solution in the same way as noted above. The addition of sodium hydroxide solution is 30 parts by weight per 100 parts of crude mixture. The reaction proceeds with a material temperature of 970° C. and an exhaust gas temperature of 650° C. The yield of the third stage is 59%–60% chromate. The total yield over all three stages, based on the chromium ore introduced in the first throughput, is 83%–84% chromate.

What is claimed is:

1. Process for the production of sodium-chromate by alkali treatment of chromium-containing material under oxidising conditions, which comprises heating said chromium-containing material continuously by oxygen-rich combustion gases to a temperature of between about 500 and 1200° C., spraying liquified sodium hydroxide selected from the group consisting of sodium hydroxide melt and sodium hydroxide solution having a concentration of at least about 30% by weight, onto said so heated material, continuing the heating of the resulting mixture at a temperature between about 800 and 1200° C. to form sodium chromate, and recovering such sodium chromate by dissolving and separating such sodium chromate from the insoluble residue.

2. Process according to claim 1 wherein said liquified sodium hydroxide is sprayed onto said chromium-containing material when said material has been heated to a temperature of between about 600 and 1000° C., and the heating is continued at a temperature of between about 900 and 1000° C.

3. Process according to claim 1 wherein said sodium hydroxide is in the form of sodium hydroxide solution having a concentration of at least about 30% by weight.

4. Process according to claim 3 wherein such concentration is between about 40–60% by weight.

5. Process according to claim 1 wherein said sodium hydroxide is in the form of a sodium hydroxide melt.

6. Process according to claim 1 wherein a part of the sodium hydroxide which is less than the equivalent quantity is correspondingly replaced by sodium carbonate and said sodium carbonate is admixed with the initial chromium-containing material before said heating.

7. Process according to claim 1 wherein the alkali treatment ordinal steps of heating, spraying and continuing of the heating are carried out in at least two repeated stages.

8. Process according to claim 7 wherein in a first stage fresh chromium-containing material in the form of ore is heated to a temperature of above 500° C. and then a first portion of sodium hydroxide which is stoichiometrically insufficient to react with the quantity of chromium present in the ore is sprayed thereon and the heating continued, wherein the resulting mass is recovered from said first stage and leached to remove the soluble chromate present from the corresponding residue which contains still unreacted chromium therein, wherein in a second stage such residue, serving as chromium-containing material, is heated to a temperature of about 500° C., and then a second portion of sodium hydroxide which is stoichiometrically sufficient to react with at least a part of the remaining quantity of unreacted chromium present therein is sprayed thereon and the heating continued, and wherein the resulting mass is recovered from said second stage and leached to remove the soluble chromate present from the corresponding residue.

9. Process according to claim 8 wherein said second stage is carried out with less than the stoichiometric amount of sodium hydroxide, such that the resulting mass recovered from said second stage and the corresponding residue after being leached still contains unreacted chromium therein, and wherein said second stage is repeated at least one more time using the corresponding residue from the previous stage as the chromium-containing material.

10. Process according to claim 8 wherein the chromium-containing material used for at least one of the stages is premixed with a diluent selected from the group consisting of lime, dolomite, iron oxide, and mixtures thereof.

11. Process according to claim 1 wherein the chromium-containing material prior to said spraying with sodium hydroxide contains a diluent selected from the group consisting of lime, dolomite, iron oxide, and mixtures thereof.

12. Process according to claim 1 wherein the alkali treatment is carried out continuously such that the reaction mixture is recovered, then leached to remove the soluble chromate constituents therefrom, with the resulting residue being recycled and combined with fresh chromium-containing material.

13. Process according to claim 1 wherein the alkali treatment is carried out in an internally heated countercurrent rotary tube furnace zone having a chromium-containing material feed end and a reaction product discharge end and including a lower temperature preheating sub-zone adjacent said feed end and a higher temperature reaction sub-zone adjacent said discharge end, and with an oxygen-rich combustion gas introduction point at the discharge end of said zone, such that the chromium-containing material is fed into said feed end and heated to a temperature of above 500° C. in said preheating sub-zone, said sodium hydroxide is sprayed in finely divided form onto and admixed with the so heated chromium-containing material in said reaction sub-zone, the heating and continuing of the heating being effected in countercurrent flow with respect to the oxygen-rich combustion gas introduced via said combustion gas introduction point, with the reaction mixture being recovered from said discharge end and said combustion gas being exhausted through said feed end, whereby a temperature gradient is established in said zones decreasing gradually from a higher temperature at said discharge end as a result of the combustion of said gas to a lower temperature at said feed end.

References Cited
UNITED STATES PATENTS

| | | | |
|---|---|---|---|
| 219,637 | 9/1879 | Gorman | 23—56 |
| 1,866,648 | 7/1932 | Hackhofer | 23—56 |
| 1,948,143 | 2/1934 | Tarr | 23—56 |
| 1,964,719 | 7/1934 | Carpenter et al. | 23—56 |
| 2,494,215 | 1/1950 | Udy | 23—56 |
| 2,501,952 | 3/1950 | Maier | 23—56 |
| 3,095,266 | 6/1963 | Lauder et al. | 23—56 |

HERBERT T. CARTER, Primary Examiner

UNITED STATES PATENT OFFICE
CERTIFICATE OF CORRECTION

Patent No. 3,510,256  May 5, 1970

Heinrich Schafer

It is certified that error appears in the above identified patent and that said Letters Patent are hereby corrected as shown below:

Column 2, line 61, cancel "same". Column 3, line 49, cancel "having", first occurrence; line 60, "he" should read -- the --; line 62, after "material" cancel "in the reaction zone is adjusted to 900° C." and insert -- inlet is adjusted to 600° C. to 700° C. --. Column 4, line 7, "40%-50%" should read -- only 40%-45% --; line 11, "treament" should read -- treatment --.

Signed and sealed this 15th day of September 1970.

(SEAL)
Attest:

Edward M. Fletcher, Jr.  WILLIAM E. SCHUYLER, JR.
Attesting Officer  Commissioner of Patents